United States Patent [19]

Okazaki

[11] 4,237,902
[45] Dec. 9, 1980

[54] ULTRASONIC DIAGNOSING APPARATUS

[75] Inventor: Takahisa Okazaki, Fuchu, Japan

[73] Assignee: Tokyo Shibaura Denki Kabushiki Kaisha, Kawasaki, Japan

[21] Appl. No.: 948,336

[22] Filed: Oct. 3, 1978

[30] Foreign Application Priority Data

Oct. 8, 1977 [JP] Japan .................. 52-121081

[51] Int. Cl.³ ............................ A61B 10/00
[52] U.S. Cl. ........................ 128/660; 73/610
[58] Field of Search .............. 128/660–663; 73/618–621, 633, 640, 610–612, 614

[56] References Cited

U.S. PATENT DOCUMENTS

| | | | |
|---|---|---|---|
| 3,086,390 | 4/1963 | Brown | 73/621 |
| 3,480,002 | 11/1969 | Flaherty et al. | 73/621 |
| 3,777,740 | 12/1973 | Hokanson | 128/663 |
| 3,924,452 | 12/1975 | Meyer et al. | 128/663 |
| 3,996,792 | 12/1976 | Kubota et al. | 73/621 |
| 4,109,642 | 8/1978 | Reid et al. | 128/663 |

FOREIGN PATENT DOCUMENTS 2724998 12/1977 Fed. Rep. of Germany .......... 128/660

OTHER PUBLICATIONS

Mountford, R. A. et al., "Semi-Automatic Transducer Movement for Ultrasonic Compound B Scanning", MBE vol. 12, No. 6, Mar. 1974, pp. 227–232.

Nakashika, M. et al., "Recent UTS Tomographic System-Sonolayergraph SSL-31A-" Intl. Ed., Toshiba Rev. Jun. 1973, No. 82, pp. 13–18.

*Primary Examiner*—Robert W. Michell
*Assistant Examiner*—Francis J. Jaworski
*Attorney, Agent, or Firm*—Cushman, Darby & Cushman

[57] ABSTRACT

In an ultrasonic diagnosing apparatus of an electronic sector-scanning type in which a target plane in a body is observed by directly contacting a probe with the body surface of a patient, a circuit for setting a depth from the body surface to the target plane has a function to compensate for variations of the depth and the swing angle of the probe arising from the unevenness on the body surface and those of the distance from the probe to the target plane due to a sector-scanning change of the ultrasonic beam.

4 Claims, 17 Drawing Figures

F I G. 6
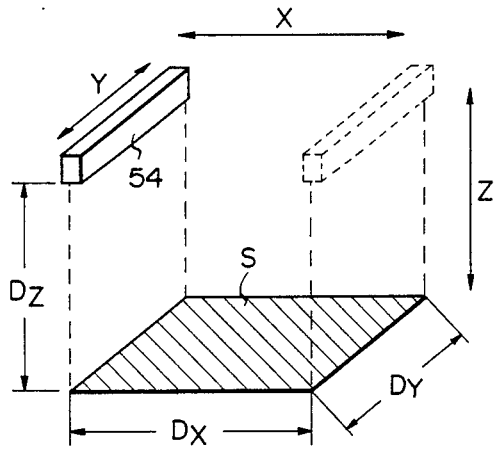
F I G. 8
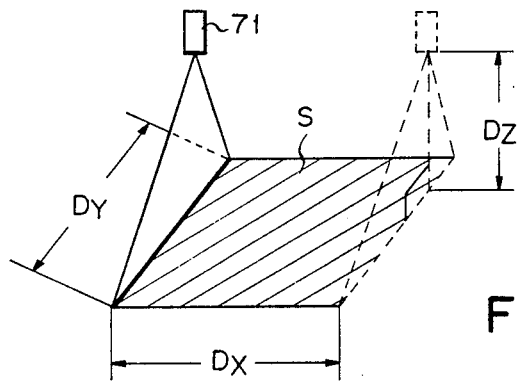

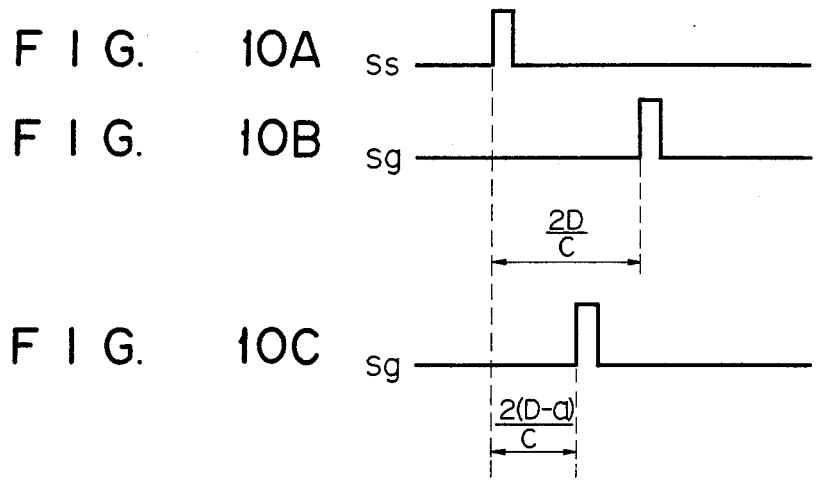
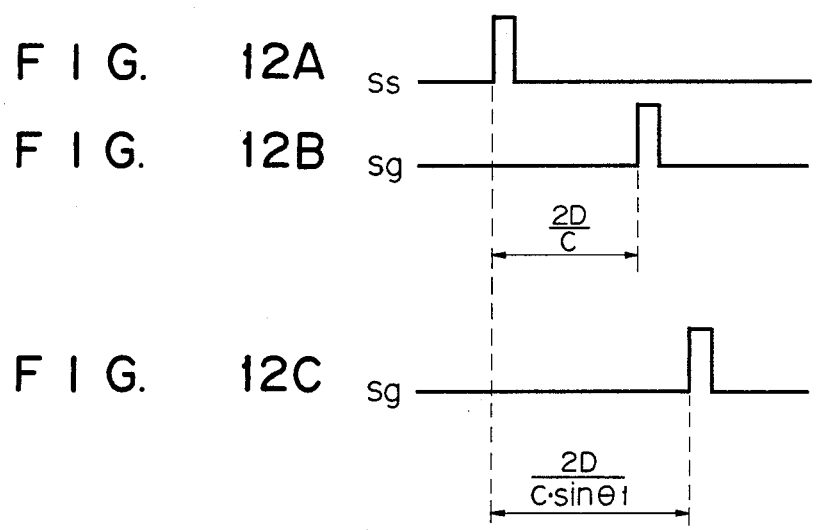

FIG. 13
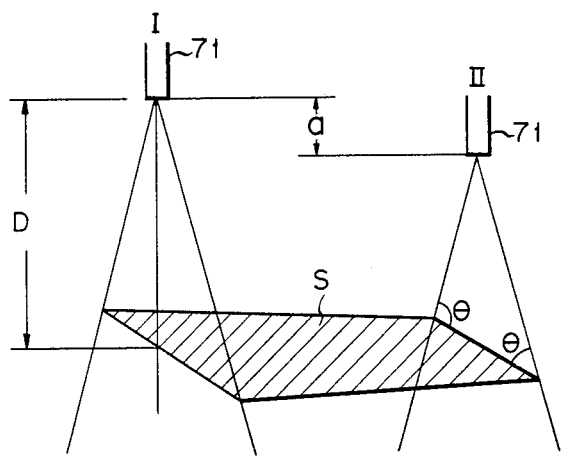
FIG. 14
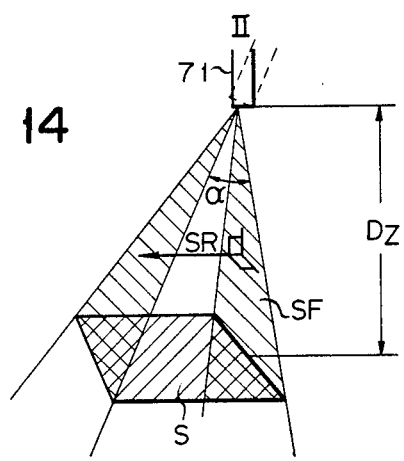
FIG. 15A
FIG. 15B
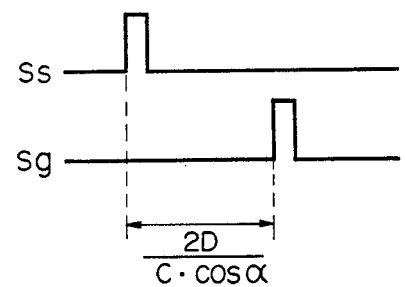

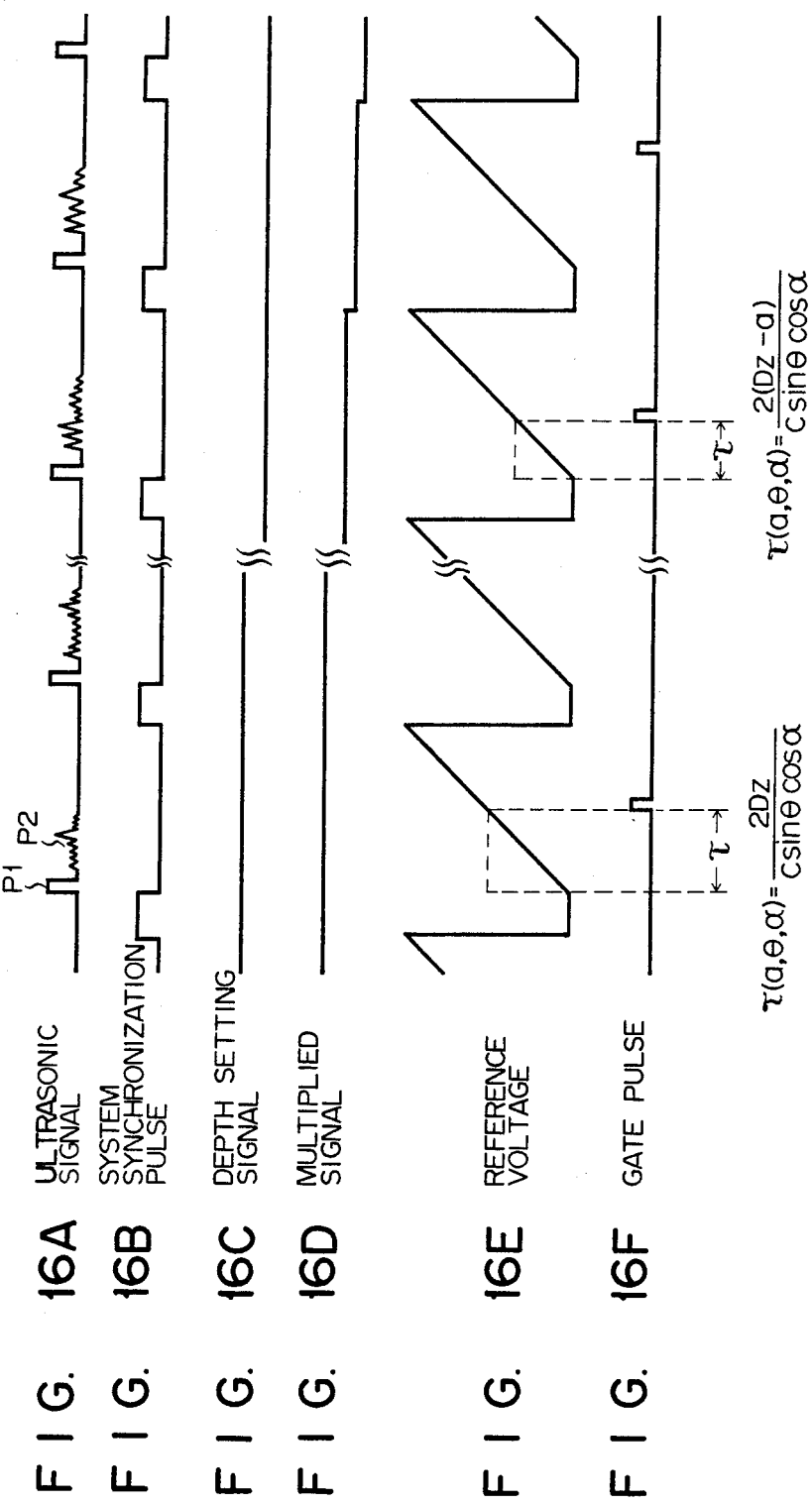

ULTRASONIC DIAGNOSING APPARATUS

BACKGROUND OF THE INVENTION

This invention relates to an ultrasonic diagnosing apparatus of a sector scan type.

An ultrasonic probe for the sector scanning used in an ultrasonic diagnosing apparatus has a plurality of transducer elements or phased-array transducer elements 2 arranged on a damper member 1, as shown in FIG. 1. Generally, the transducer element 2 is a piezoelectric element which converts an electric signal into a mechanical vibration and vice versa. Each transducer element 2 is connected to an individual electrode 3. In practical use, the probe is placed on a body surface of a patient and is supplied with electric signals for electronically scanning a target plane in the body.

There will now be described the principle of the electronic scanning. As shown in FIG. 2, an electric signal is applied to each group of five transducer elements generally designated by 2 from left to right. Specifically, the signal is successively applied to each group or block of five elements, $2_1$ to $2_5$, $2_2$ to $2_6$, $2_3$ to $2_7$ . . . . The signals are progressively applied to the transducer elements by shifting the transducer elements 2 pitch by pitch. Therefore, the blocks each consisting of five transducer elements 2 successively shift to the right pitch by pitch as viewed in FIG. 2. Upon receipt of the signal, each element block emits an ultrasonic wave radially. The most intensive field of the ultrasonic wave is at the central part of the element block including five transducer elements. Therefore, an ultrasonic beam UB may be considered to be radiated from the transducer elements located at the central part. Each block is successively shifted to the right so that the ultrasonic beam UB also shifts to the same direction. The scanning method is called a linear scanning in which the ultrasonic beam may be considered to be radiated from the central part of the ultrasonic radiating surface of the probe which is driven sequentially in parallel. The conventional ultrasonic diagnosing apparatus is described in Uchida et al 19–33 "Electro-Scanning Ultrasonic Diagnosing Equipment", a thesis announced at the convention sponsored by Japanese Institution of Medical Ultrasonics, May, 1971. Another known scanning method is a sector scanning method in which signals with different phases are applied to corresponding blocks each consisting of, for example, five transducer elements. In this case, the most intensive field of the ultrasonic wave changes in response to pulses with the phase difference which drive the elements. Accordingly, the radiation angle of the ultrasonic beam depends on the phase difference and therefore the radiation direction of the ultrasonic beam may be changed by changing the phase difference. The sector scanning may accordingly be carried out if the phase difference is continuously changed.

The electronic scanning method at present is roughly classified into the linear scanning method in which the ultrasonic beam is shifted in parallel and a sector scanning method in which the ultrasonic beam is shifted in a sector pattern, the principle of which is disclosed in U.S. Pat. No. 3,789,833.

In the linear scanning method, the probe 4 is constructed by using a large number of transducer elements 2 horizontally arranged in parallel, as shown in FIG. 3. As described above, in this method, the scanning direction (an arrow A) of the beam UB is the same as the element arranged direction. The radiating direction of the ultrasonic beam UB is normal to the element-arranged direction.

In the sector scanning method, the probe 5 includes for example, five phased-array transducer elements 2 horizontally arranged representing each block, as shown in FIG. 4. In operation, electric signals with fixed phase differences are sequentially applied to the respective transducer elements 2 and the phase difference also is sequentially changed so that the ultrasonic beams are radially emitted with respect to the center point on the probe.

A conventional ultrasonic diagnosing apparatus for "C" mode display by the electronic scanning system, which is two-dimensional image in a plane perpendicular to the "B" mode display, generally employs the linear electronic scanning method and this is realized by a water immersing method, as shown in FIG. 5. Reference numeral 51 is a linear scanning controller for providing a control signal to control the scanning operation of the device. In response to the control signal from the controller 51, a pulse circuit produces pulse signals which are applied to a probe 54 for linear scanning in an ultrasonic wave scanner 53. Then, the probe 54 vibrates to radiate an ultrasonic wave. The probe 54 is immersed in liquid (water, liquid paraffin or the like) 56 in a water bag 55 placed on a patient 57 and the ultrasonic wave is transmitted through the liquid 56 to the patient 57 contacting the water bag 55. A part of the ultrasonic wave is reflected from a location having a different acoustic impedance in the patient body 57, and returns to the probe 54. The reflected ultrasonic wave is converted into a corresponding electrical signal. The electrical signal is supplied in accordance with a control signal from a scanning controller 51 to a receiver 58 where it is amplified and then transmitted to a gate circuit 59. The gate circuit 59 permits the passing therethrough of video signal from a depth $D_Z$ set by a depth setting circuit 60 for setting a target plane in the patient body to be displayed in "C" mode, i.e. the depth $D_Z$ from the body surface. The video signal passing through the gate circuit 59 is transferred to a monitor 61. The probe 54 is mechanically moved in a direction X of arrow within a range for a "C" mode, by means of a scanner 53. The moving position is detected by a scanning position detection circuit 62 and then is supplied to the monitor 61.

A signal which represents a position on a Y-axis in scanning is transferred from a scanning controller 51 to a monitor 61. These three signals cooperate to display a brightness-modulated image in "C" mode on a screen of the monitor 61. Specifically, assuming that the moving range of the probe 54 by the scanner 53 is represented by $D_X$ in X-axis direction, and the electronic scanning range of the probe 54 by $D_Y$ in Y-axis direction, displayed is an image on a plane S defined by $D_X$ and $D_Y$ at the depth $D_Z$ in Z-axis direction, as shown in FIG. 6.

As described above, in the conventional "C" mode display, the electronic scanning may be applicable for the Y-axis direction. For the X-axis, however, the mechanical movement by the scanner 53 must be used. It is for this reason that, by convention, the water bag 55 is used for ensuring a smooth mechanical movement of the probe and a good transmission of the ultrasonic wave. This method, however, suffers from the following disadvantages: - (1) for every observation, the water bag 55 must be replaced corresponding to the body surface configuration of the patient 57 or the target location; (2) when the body surface is uneven, the entire surface must be intimately in contact with the water bag 55. It is very difficult, however, to obtain a perfectly intimate contact therebetween. Reflection or damping of the ultrasonic wave at the poor contact location is unavoidable, resulting in deterioration of the image quality.

The contact method in which the probe is directly in contact with the body surface, has frequently been used. The linear scanning probe has a relatively large width so that it is very difficult to intimately contact the entire scanning area of the probe with the body surface. The linear scanning probe has the construction as mentioned above so that the probe width is fixed, that is to say, can not be varied. Therefore, the probe must be selected for use in accordance with the object to be observed and this is very troublesome.

SUMMARY OF THE INVENTION

Accordingly, an object of the invention is to provide an ultrasonic diagnosing apparatus overcoming the disadvantages as mentioned above, by employing an ultrasonic probe for sector scanning and the contact method as well.

According to the invention, there is provided an ultrasonic diagnosing apparatus comprising: an ultrasonic probe for sector scanning having a plurality of transducer elements to radiate an ultrasonic wave and receive its reflected wave; a scanner for moving the ultrasonic probe in contact with the body surface of a patient; pulse generation means for generating a pulse to drive the transducer elements; a scanning controller for controlling pulse generation of the pulse generating means and the pulse phase to swing an ultrasonic beam emitted from the probe; position detecting means for detecting a position of the probe; a depth setting means which sets a diagnostic depth of a target plane in the body and compensates for a variation of the distance from the probe to the target plane due to a direction change of the ultrasonic beam, a variation of the distance due to the unevenness of the body surface and a variation of the distance from the probe surface when the probe is inclined with respect to the axis of the probe due to the unevenness of the body surface to the target plane; means for extracting the reflected wave which is coupled to the probe in accordance with a signal from the depth setting means; and display means for visualizing the reflected wave from the extracting means.

Other objects and features of the invention will be apparent from the following description taken in connection with the accompanying drawings, in which:

BRIEF DESCRIPTION OF THE DRAWINGS

FIG. 6 schematically illustrates a scanning range by the ultrasonic probe shown in FIG. 5;

FIG. 8 schematically illustrates a scanning range and a scanning state of the ultrasonic probe used in the apparatus in FIG. 7;

FIGS. 10a to 10c show timing charts illustrating the relation between transmitting pulses and a gate pulse at points I and II in FIG. 9;

FIGS. 12A to 12C illustrate time charts for illustrating the relation between the gate control signal and the transmitting pulse when the transmitting direction of the ultrasonic beam is changed in the case of FIG. 11;

FIG. 13 shows change of the ultrasonic wave propagating distances when the distance between the probe and the target plane changes and the radiating direction of the ultrasonic beam changes;

FIG. 14 is a diagram for illustrating the case where the probe is used in compound fashion;

FIGS. 15A and 15B show timing charts for illustrating the operation is the case of FIG. 14;

FIG. 16 is a set of waveforms for illustrating the operation of the ultrasonic diagnosing apparatus in FIG. 7.

DETAILED DESCRIPTION OF THE PREFERRED EMBODIMENT

An embodiment of an ultrasonic diagnosing apparatus according to the invention will be described with reference to FIGS. 7 to 17.

Figure 1:
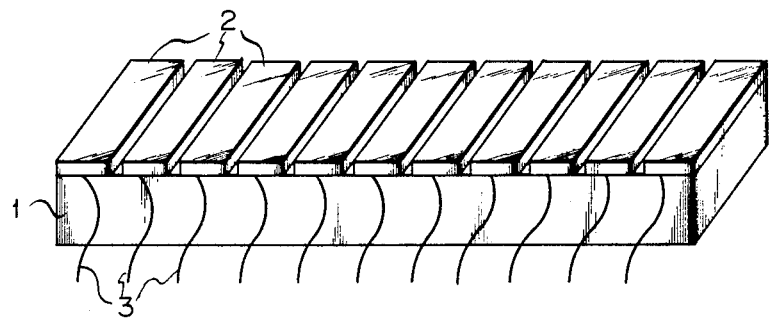
FIG. 1 shows a perspective view of an ultrasonic probe for an electronic scanning method.
Figure 2:
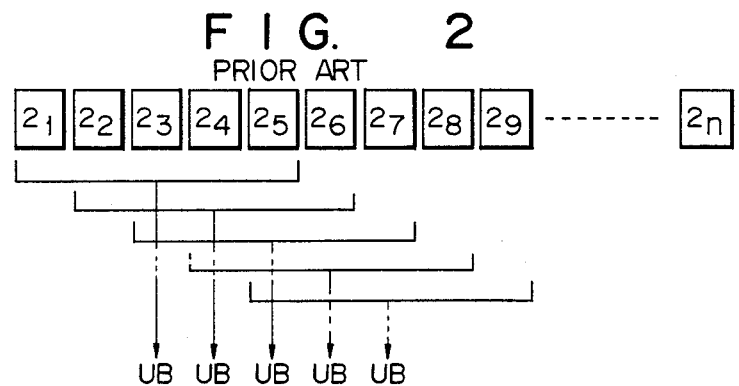
FIG. 2 schematically illustrates the operation principle of the electronic scanning method.
Figure 3:
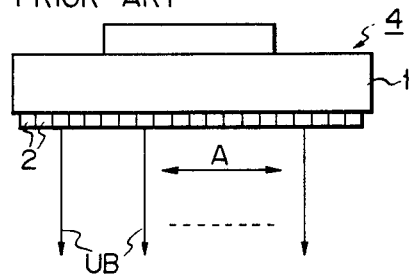
FIG. 3 shows a conventional ultrasonic probe for linear scanning.
Figure 4:
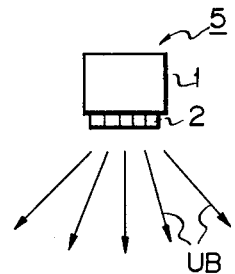
FIG. 4 shows a conventional ultrasonic probe for sector scanning.
Figure 5:
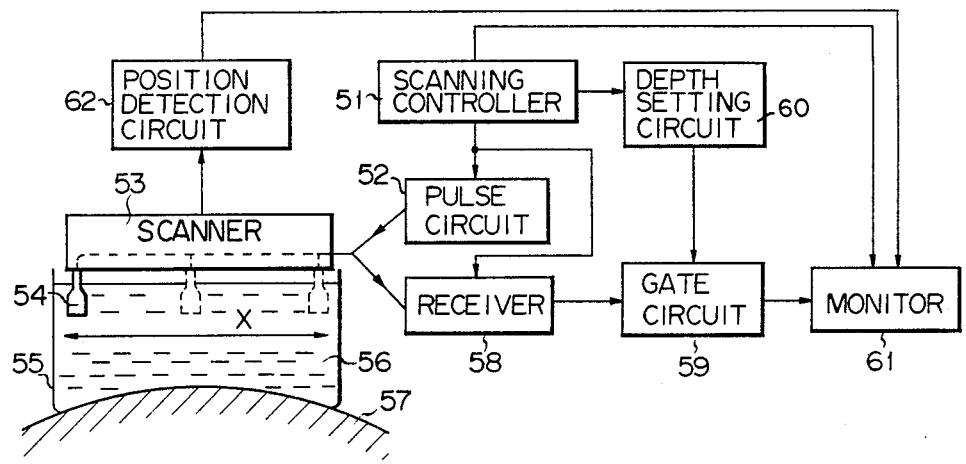
FIG. 5 shows a block diagram for illustrating a conventional ultrasonic diagnosing apparatus with "C" mode display.
Figure 7:
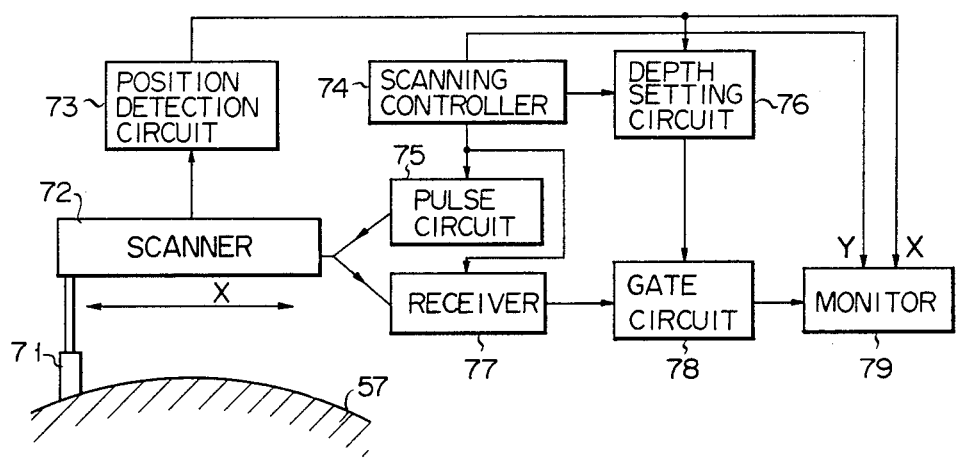
FIG. 7 shows a block diagram of an embodiment of an ultrasonic diagnosing apparatus according to the invention.

Referring now to FIG. 7, there is shown an ultrasonic diagnosing apparatus according to the invention. Reference numeral 71 denotes an ultrasonic probe for sector scanning as shown in FIG. 4 and, in practical use, the probe 71 is directly in contact with the body surface of a patient 57. A scanner 72 mechanically moves the probe 71 in a direction of X as shown. A scanning position detection circuit 73 detects the position of the probe 71 moved by the scanner 72. A scanning controller 74 controls an electronic sector-scanning operation of the device. A pulse circuit 75 generates pulses for driving the probe 71 under control of the control signal from the scanning controller 74. The pulses have phase differences in accordance with the control signal. A depth setting circuit 76 sets the depth of a target plane to be displayed in "C" mode. A receiver 77 operates under control of the control signal of the controller 74 and amplifies and detects the ultrasonic wave reflected which has been transmitted by the probe 71. A gate circuit 78 permits an output signal from the receiver 77 to pass therethrough under control of the depth setting circuit 76. Specifically, the gate 78 permits only the output signal corresponding to the depth set by the circuit 76 to pass therethrough. A monitor 79 displays a signal from the receiver 77 at a location defined by the output signal from the position detection circuit 73 and the control signal from the controller 74.

In operation, to start, the controller 74 produces a control pulse signal for an electronic sector-scanning.

Upon receipt of the control signal, the pulse circuit 75 produces pulses each with a predetermined phase depending on the control pulse. The output pulses from the pulse circuit 75 are then applied to the probe 71. When receiving the pulses, the respective transducer elements of the probe 71 vibrate with the corresponding phases so that the probe 71 emits an ultrasonic beam in the directions determined depending on the phases. The control signal controls the pulse circuit 75 so that the probe 71 radiates the ultrasonic pulses in a sector pattern. Thus, the ultrasonic beams are transmitted from the probe 71 in a sector pattern. The radiated ultrasonic beam is directly propagated into the patient's body 57 and it partly reflects from the location in the body where an acoustic impedance is changed and returns to the probe 71. When receiving the reflected wave, the respective transducer elements convert it into the corresponding electric signals. The electric signals are applied to the receiver 77. The receiver 77 operates in response to control signal derived from the controller 77 and detects and amplifies the electric signals and then applies them to the gate circuit 78. When the depth setting circuit 76 sets the depth for "C" mode display, the setting circuit 76 receives the control signal from the controller 74 and the scanning position detection circuit 73, and delivers a signal to the gate circuit 78 at the timing corresponding to the set depth. In response to the signal from the depth setting circuit 76, the gate circuit 78 permits the signal from the receiver 77 to pass therethrough to the monitor 79. To the monitor 79 are applied a signal representing Y-axis from the controller 74 and a signal representing X-axis from the scanning position detection circuit 73. Accordingly, the monitor 79 visualizes the reflection signal at the location defined by the X- and Y-axis signals. The probe 71, which is moved along the X-axis by the scanner 72, is of the type to achieve an electronic sector scanning in the Y-axis direction. When moved along the X-axis, the probe 71 scans the region which is defined by its sector scanning angle with respect to the Y-axis and the distance for which it moves along the X-axis. As a result, the monitor 79 displays a "C" mode image of this region at a predetermined depth $D_Z$.

Let us now consider the depth setting circuit 76 for "C" mode display. In the conventional method, the probe is immersed in water contained in a flexible bag placed on the body surface. The ultrasonic wave radiated from the probe propagates through the water to the patient body. That is, the probe is not directly in contact with the body surface. For this reason, when the probe is horizontally moved, the depth may be set independently of the unevenness of the body surface. Therefore, the target plane to be displayed in "C" mode is kept equidistant from the probe irrespective of the position of the probe, with the result that a time taken from transmission of the ultrasonic wave to be reflected is also kept constant. As a consequence, the gate circuit may be so designed that, after time 2W/C (W: the distance between the probe and the target plane, C: the propagation velocity of ultrasonic wave in a body) the gate circuit is open for a setting time.

Figure 9:
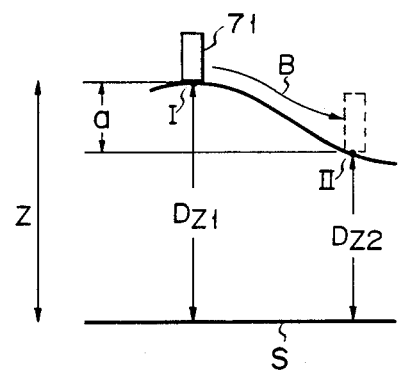
FIG. 9 shows the movement of the probe by the scanner according to the invention relative to the body surface.

On the other hand, the ultrasonic diagnosing apparatus according to the invention employs a contact method for directly contacting the probe 71 with the body surface. Accordingly, the probe 71 moves, in Y-Z plane direction as indicated by an arrow B, along the body surface above the target plane S to be observed in the patient body, tracing the configuration of the body surface, as shown in FIG. 9. Thus, the distance between the probe 71 and the target plane S varies as the probe 71 moves. For example, in FIG. 9, the depth $D_{Z1}$ from the body surface at point I to the target plane S is deeper by "a" than the depth $D_{Z2}$ at point II, that is, $D_{Z2}=D_{Z1}-a$. Therefore, in the depth setting the difference "a" arising from the movement of the probe 71 must be corrected. Provided that the point I in FIG. 9 is defined as a reference point and the depth between the probe 71 and the target plane S as the distance D, then the generation of the gate control signal Sg (FIG. 10B) from the depth setting circuit 76 toward the gate circuit 78 must be delayed by 2D/C behind the generation of the transmitting pulse Ss (FIG. 10A). At the point II, the generation of the gate control signal Sg (FIG. 10C) is delayed by 2(D−a)/C from the generation of the transmitting pulse Ss (FIG. 10A).

Figure 11:
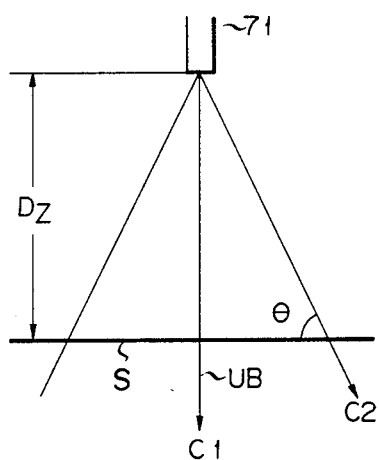
FIG. 11 schematically illustrates the relation between the emitting direction of the ultrasonic beam in a sector scanning and the distance from the target plane to the probe.

Further, since the sector scanning method is employed in the present invention, the distance between the probe 71 and the target plane S changes as the ultrasonic beam UB electrically swings, as shown in FIG. 11. Therefore, the depth setting circuit 76 must be able to compensate for the distance change. Specifically, when the ultrasonic wave UB is radiated in a direction $C_1$ perpendicular to the target plane S, the gate control signal Sg (FIG. 12B must be generated with a delay of 2 D/C after the transmitting pulse Ss (FIG. 12A). When the direction of the ultrasonic beam UB is inclined with an angle θ to the target plane S, as indicated by $C_2$, the generation of the gate control signal Sg (FIG. 12C) must be delayed by 2 D/C sin θ behind the transmitting pulse Ss.

As shown in FIG. 13, when the target plane S is set at the depth D from the body surface at the reference point I, in order to observe the target plane S, the gate control signal for processing the reflected signal which is received at the point II must be delayed by τ(a, θ) behind the transmitting pulse Ss.

$$\tau(a,\ \theta)=2(D-a)/C \sin \theta \qquad (1)$$

When the probe 71, however, is swung in an angle α with respect to a direction SR perpendicular to the sector plane SF, the gate control pulse (FIG. 15B) must be delayed by 2D/cos α behind the transmitting pulse (FIG. 15A). Therefore, the equation (1) can be rewritten, $$\tau(a,\ \theta,\ \alpha) = \frac{2(D-a)}{C \sin\theta \cos\alpha} \qquad (2)$$

As a consequence, the depth setting circuit 76 must be adjusted so that it may produce a pulse with a time delay τ as a gate control signal to the gate circuit 78.

As described above, in the invention, the ultrasonic probe for sector scanning is used; the scanning width is adjusted by setting a swing angle of the sector; the scanner moves the probe in contact with the body surface of a patient over a target range. Accordingly, there is no need of a water bag unlike the conventional apparatus. The scanning width by the probe may be properly adjusted by merely adjusting the swing angle of the sector. Further, the probe may be used intimately in contact with the body surface, thus securing a good picture quality.

FIGS. 16A to 16F show a set of waveforms at several points in the circuit in FIG. 7. FIG. 16A is a waveform of ultrasonic wave in which P1 indicates pulse generated from the pulse circuit 75 and P2 ultrasonic echo reflected from the body inside. FIG. 16B shows a pulse signal to control a timing of the initiation of the probe 71, i.e. a system synchronization pulse signal. The scanning initiates at the trailing edge of the pulse of FIG. 16B. FIGS. 16C to 16F show waveforms at the respective point in the depth setting circuit 76.

Figure 17:
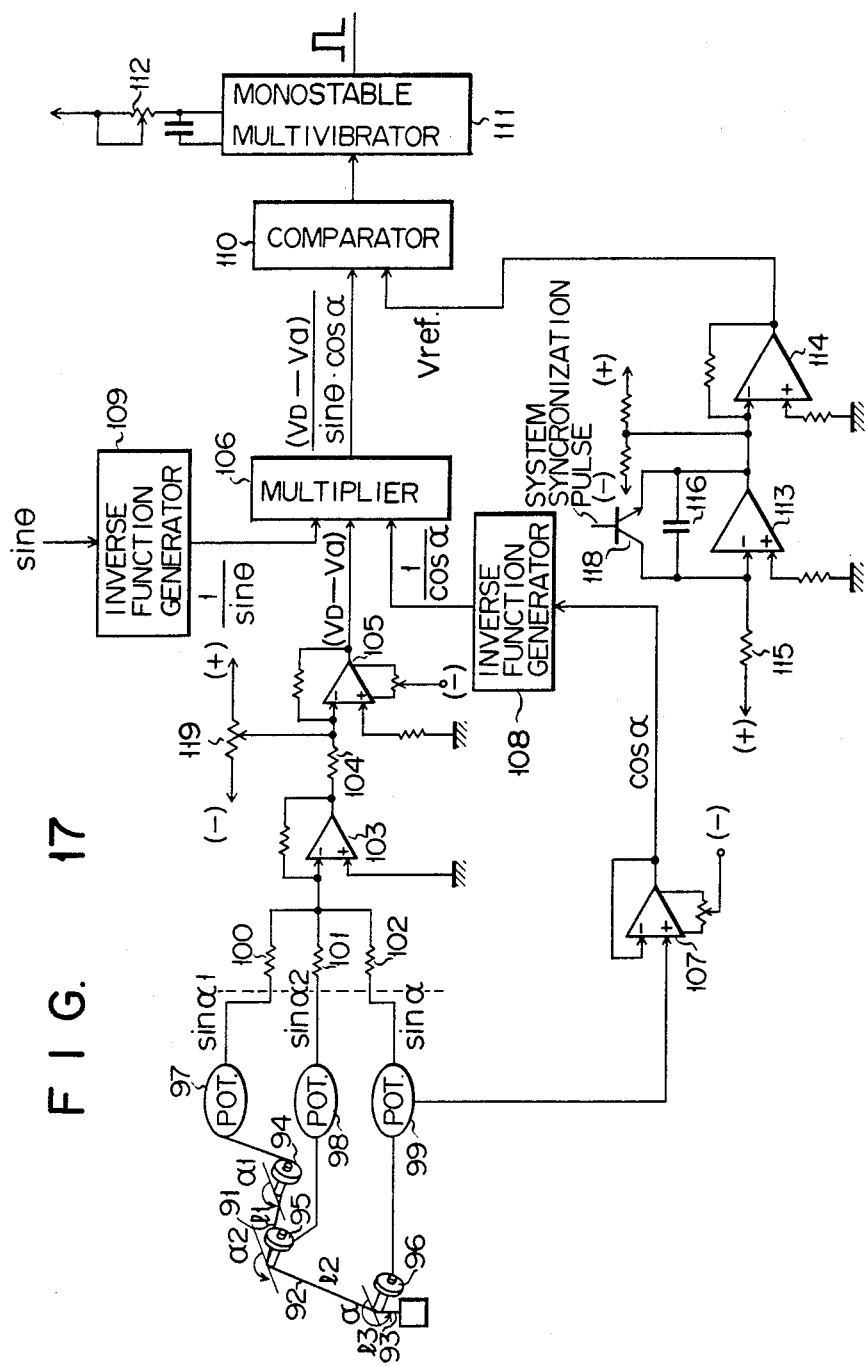
FIG. 17 is a block diagram of a depth setting circuit used in the apparatus of the invention.

The details of the depth setting circuit 76 will be described with reference to FIG. 17. As shown, the probe 71 is provided with three arms 91 to 93 continuously arranged with the lengths $l_1$ to $l_3$. The arms 91 to 93 are provided with pulleys 94 to 96, respectively. The sine-cosine potentiometers 97 to 99 detect angular movements of the arms 91 to 93 and convert them into the corresponding electric signals. The potentiometer 97 produces a signal representing an angle $\alpha_1$; the potentiometer 98 a signal representing an angle $\alpha_2$; the potentiometer 99 a signal of an angle $\alpha$. The potentiometers 97 to 99 are coupled through weighting resistors 100 to 102 with a first operational amplifier 103. The operational amplifier 103 sums up sine signals from the potentiometers 97 to 99 to produce a summed signal which is directly proportional to the value ($l_1 \sin \alpha_1 + l_2 \sin \alpha_2 + l_3 \sin \alpha$). The summed signal voltage $V_a$ represents the depth difference "a". The output terminal of the amplifier 103 is connected to a first input terminal of a second operational amplifier 105, through a resistor 104. To the first input terminal connected is a sliding terminal of a variable resistor 119 for setting the voltage $V_D$ which represents reference diagnostic depth D. The second input terminal of the amplifier 105 is connected to the ground. The amplifier 105 produces an output signal voltage ($V_D-V_a$) representing a depth difference (D–a). (See FIG. 16C) The output signal is applied to a multiplier circuit 106.

The potentiometer 99 is also connected to a third operational amplifier 107, which, in turn, converts an output signal derived from the potentiometer 99 into a cos $\alpha$ signal. The cos $\alpha$ signal is converted into a 1/cos $\alpha$ signal, by means of an inverse function signal generator 108. The 1/cos $\alpha$ signal is applied to the multiplier circuit 106. A sin $\theta$ signal is supplied through an inverse function generator 109 to the multiplier 106. Accordingly, the multiplier 106 produces the product signal of three signals, i.e.

$$\frac{(V_D - V_a)}{\sin\theta \cdot \cos\alpha}$$

signal (FIG. 16D). The multiplier circuit 106 is connected to the first input terminal of a comparator 110. The second input terminal of the comparator 110 is connected to a time-based reference signal $V_{ref}$ (FIG. 16E).

The reference signal generator is comprised of two operational amplifiers 113 and 114. The amplifier 113 is coupled at the first input terminal with a fixed potential signal, through a resistor 115. A capacitor 116 is connected between the first input terminal and the output terminal of the amplifier 113, and further is connected to a transistor 118 for controlling charging and discharging to and from the capacitor 116. The transistor 118 is turned on by the system synchronizing pulse from the scanning controller 74. The output signal from the amplifier 113 is applied to as the $V_{ref}$ signal to a comparator 110, through an operational amplifier 114 serving as D.C. level setting.

The comparator 110 compares the $$\frac{V_D - V_a}{\sin\theta \cdot \cos\alpha}$$

signal with the reference signal $V_{ref}$. When these voltages are equal, the comparator 110 produces an output signal which in turn is applied to a monostable multivibrator 111. In response to the signal, the multivibrator 111 produces a pulse signal which is delayed by $\tau(a, \theta, \alpha)$ (FIG. 16F). A gate circuit 78 is subjected to the control of the pulse signal from the multivibrator 111. The pulse width of the pulse signal from the multivibrator 111 may be properly set at any desired value by a volume resistor 112.

What is claimed is:
1. An ultrasonic diagnosing apparatus comprising:
   ultrasonic probe means for radiating an ultrasonic wave in a sector-scanning manner toward a target to be diagnosed in an object and receiving a reflected ultrasonic wave therefrom; said ultrasonic probe means including a plurality of electromechanical transducer elements;
   scanner means for mechanically moving said ultrasonic probe means in contact with the surface of the object;
   means for generating a pulse to drive said transducer elements;
   scanning controller means for controlling pulse generation of said pulse generating means and the pulse phase thereof to change the direction of said ultrasonic wave radiated from said transducer elements;
   means for detecting a position of said ultrasonic probe means;
   depth setting means for generating a pulse (including a component indicative of a diagnostic depth of the target plane of the body and further including components of compensation for a variation of the distance between said ultrasonic probe means and the target plane due to a direction change of the ultrasonic wave, a variation of the distance due to the unevenness of the surface of the object and a variation of the distance due to the inclination of said ultrasonic probe means with respect to the axis perpendicular to the target plane;
   means for deriving a C-Mode image signal from the reflected ultrasonic wave coupled to said transducer elements in accordance with the output pulse of said depth setting means; and
   means coupled to said deriving means for displaying the C-mode image of the target.
2. An ultrasonic diagnosing apparatus according to claim 1, wherein said depth setting means is comprised of a first means for setting a diagnostic depth of the target plane in the object to be diagnosed and a second means for compensating for variation of the distance from said ultrasonic probe means to the target plane arising from change of the direction of the ultrasonic wave, variation of the depth from said ultrasonic probe means to said target plane arising from the unevenness of the surface, and variation of the distance from said probe means to the target plane arising from an inclination of the axis of said probe means due to the unevenness of the surface.
3. An ultrasonic diagnosing apparatus according to claim 2, wherein said first means comprises means for setting a level designating the diagnostic depth of the target plane at the reference point on the object, and said second means comprises a position transducer for converting an amount of movement ($l_1 \sin \alpha_1 + l_2 \sin \alpha_2 + l_3 \sin \alpha$) of the probe means into the corresponding electrical signals which include a cosine signal ($\cos \alpha$) of a swing angle ($\alpha$) of the probe means, an operational amplifier for summing said electrical signals to produce a first electrical (Va) signal of an instant diagnostic depth, a second amplifier for producing a second electrical signal ($V_D$-Va) of the difference between said set level ($V_D$) and said first electrical signal ($V_D$), a first function generator for converting said cosine signal ($\cos \alpha$) into an inversed cosine signal ($1/\cos \alpha$), a second function generator for producing an inversed sine signal ($1/\sin \theta$) of a sector scanning angle ($\theta$) defined between said ultrasonic wave and the target plane, a reference signal generator for generating a time-based reference signal ($V_{REF}$), a multiplier for multiplying said second electrical signal ($V_D$-Va) by said inversed cosine signal ($1\cos \alpha$) and said inversed sine signal ($1/\sin \theta$) to produce an output signal of the product $$\left( \frac{(V_D - Va)}{\sin\theta \cdot \cos\alpha} \right),$$

a comparator for comparing said product signal $$\left( \frac{(V_D - Va)}{\sin\theta \cdot \cos\alpha} \right)$$

with said time-based reference signal ($V_{REF}$) and producing an output signal when the level of the product signal $$\left( \frac{(V_D - Va)}{\sin\theta \cdot \cos\alpha} \right)$$

is equal to that of the reference signal ($V_{REF}$), and a multivibrator for producing a gate pulse signal upon receipt of the output signal from the comparator, said multivibrator being coupled to said deriving means.

4. An ultrasonic diagnosing apparatus comprising:
ultrasonic phase-array transducer means for sector scanning of an ultrasonic beam, said transducer means having a plurality of transducer elements to radiate said ultrasonic beam and receive its reflected beam so as to produce an electrical signal;

mechanical scanning means for moving said ultrasonic transducer elements in contact with a surface of an object;

pulse generating means for generating pulse with a predetermined phase shift to drive said transducer elements which radiate said ultrasonic beam in the form of the sector scanning pattern;

scanning controlling means for controlling said phase shift of said pulses generated in said pulse generating means;

means for detecting an amount of depth displacement between said transducer means located at a reference position on the surface and target plane, said displacement resulting from the unevenness of the surface as said mechanical scanning means moves said ultrasonic transducer means, a sector scanning angle ($\theta$) defined between said ultrasonic beam and said target plane, and a swing angle ($\alpha$) of said transducer means with respect to a direction perpendicular to the sector scanning plane, said swing angle ($\alpha$) resulting from the unevenness of the surface;

depth setting means for generating a pulse indicative of a diagnostic depth of said target plane in the object and compensative components for variations of said diagnostic depth in accordance with a following equation, $$\tau(a, \theta, \alpha) = \frac{2(D - a)}{C \sin\theta \cdot \cos\alpha}$$

where:
"$\tau(a, \theta, \alpha)$" is a time delay of the pulse generated by said depth setting means after radiating said ultrasonic beam,
"a" is the amount of said displacement,
"C" is the velocity of the ultrasonic beam in the object,
"D" is said diagnostic depth,
"$\theta$" is said sector scanning angle, and
"$\alpha$" is said swing angle;

means for gating the electrical signal of said reflected ultrasonic beam according to said equation; and
means for displaying a C-mode image of the target.

* * * * *